United States Patent
Biegelsen et al.

(10) Patent No.: US 6,406,747 B1
(45) Date of Patent: Jun. 18, 2002

(54) METHODS OF ENCAPSULATING CORES USING INK JETS OR FOGS

(75) Inventors: David K. Biegelsen, Portola Valley, CA (US); Naveen Chopra, Oakville; Karen A. Moffat, Brantford, both of (CA); Nicholas K. Sheridon, Los Altos, CA (US)

(73) Assignee: Xerox Corporation, Stamford, CT (US)

( * ) Notice: Subject to any disclaimer, the term of this patent is extended or adjusted under 35 U.S.C. 154(b) by 60 days.

(21) Appl. No.: 09/722,565

(22) Filed: Nov. 28, 2000

(51) Int. Cl.$^7$ ................................................. B01J 13/02
(52) U.S. Cl. ........................ 427/213.34; 427/213.32; 427/213.33; 427/214; 427/220; 427/248.1; 427/255.5; 428/402.2; 428/402.21; 428/402.24; 428/403
(58) Field of Search .................. 427/213.32, 213.33, 427/213.34, 214, 220, 248.1, 255.5; 428/402.2, 402.21, 402.24, 403; 424/489, 490, 497; 264/4.7

(56) References Cited

U.S. PATENT DOCUMENTS

| | | |
|---|---|---|
| 4,702,988 A | 10/1987 | Fukumoto et al. |
| 4,727,011 A | 2/1988 | Mahabadi et al. |
| 4,727,101 A | 2/1988 | Ogoe et al. |
| 4,738,898 A | 4/1988 | Vivant |
| 4,766,051 A | 8/1988 | Breton et al. |
| 4,851,318 A | 7/1989 | Hsieh et al. |
| 5,035,970 A | 7/1991 | Hsieh et al. |
| 5,037,716 A | 8/1991 | Moffat |
| 5,077,167 A | 12/1991 | Ong et al. |
| 5,082,757 A | 1/1992 | Koeshkerian et al. |
| 5,139,915 A | 8/1992 | Moffat et al. |

*Primary Examiner*—Samuel A. Acquah
(74) *Attorney, Agent, or Firm*—Oliff & Berridge, PLC

(57) ABSTRACT

A method of coating a liquid or solid particulate core involves dropping or suspending the particulate core in an atmosphere and then applying a liquid coating while the particulate core is dropped or suspended, the applying of the liquid coating being done by either (a) spraying the liquid coating onto the particulate core with an ink jet or (b) moving the particulate core through a fog of the liquid coating. In a further embodiment, the method can be used for encapsulating a liquid or solid particulate core within a polymeric shell by dropping or suspending the particulate core in an atmosphere, then applying by one of the above-mentioned methods a first coating composition containing a first reactant to the particulate core while the particulate core is being dropped or suspended, and subsequently exposing the particulate core coated with the first coating composition to a second composition containing a second reactant which reacts with the first reactant, which second composition is immiscible with the first coating composition, whereby the polymeric shell is formed by interfacial polymerization. By these methods, the formation of membranes or polymer shells around a variety of particulate core materials can be done using precise amounts of coating materials, thereby reducing waste and improving efficiencies of the process.

24 Claims, 2 Drawing Sheets

METHODS OF ENCAPSULATING CORES USING INK JETS OR FOGS

BACKGROUND OF THE INVENTION

1. Field of the Invention

The present invention relates to a method for coating a particle core material with a precise amount of a liquid coating, and to a method of encapsulating a core particle via interfacial polymerization.

2. Discussion of Related Art

Various methods are known for applying a coating to particulate materials.

However, an area of continuing need in this technology is the development of a method that permits precise control over the amount of coating material applied to the particles.

This need is particularly evident in interfacial polymerization applications for deriving a polymeric shell around a particle core. Interfacial polymerization has been used in the field of making toners, for example encapsulated colored heat fusible toner compositions. See, for example, U.S. Pat. Nos. 5,035,970, 5,139,915, 5,077,167 and 5,082,757, incorporated herein by reference in their entire U.S. Pat. No. 4,738,898 is directed to microencapsulation by interfacial polyaddition of, for example, an aliphatic diisocyanate and an isocyanurate triamer, and wherein the aforementioned components can be interfacially reacted with a polyamine; note the disclosure in column 3, beginning at line 46, wherein it is indicated that it is envisioned, for example, to encapsulate plant protection agents such as herbicides, fingicides, or insecticides, which makes them less hazardous to handle, and it is also intended to encapsulate the pharmaceutical products, food products, flavors, perfumes, colorants, paints, or catalysts, reference the disclosure in column 3, beginning at line 46.

U.S. Pat. No. 4,766,051 is directed to colored encapsulated toner compositions comprised of a core containing a polymer in which is dispersed pigment particles selected from the group consisting of cyan, magenta, red, yellow pigments, and mixtures thereof, and magnetites encapsulated within a polymeric shell formulated by an interfacial polymerization. For the interfacial polymerization, the organic phase can be dispersed by a polytron in an aqueous phase containing polyvinyl alcohol to obtain toner particles.

U.S. Pat. No. 4,727,101 illustrates a free radical polymerization of a toner shell at elevated temperatures and more specifically is directed to the preparation of encapsulated toner compositions, which comprises mixing in the absence of a solvent a core monomer, initiator, pigment particles, a first shell monomer, stabilizer, and water, and thereafter adding a second shell monomer to enable interfacial polymerization interaction, and subsequently affecting the free radical polymerization of the core monomer.

U.S. Pat. No. 4,702,988 illustrates a process for the preparation of encapsulated toner. A monomer composition and a colorant are dispersed in a liquid dispersion medium in the presence of a solid fine powdery dispersion stabilizer. The liquid is pressurized and then ejected into a low pressure section to form particles of monomer composition. These particles are then subjected to suspension polymerization to produce toner particles.

U.S. Pat. No. 4,727,011 discloses a process for preparing encapsulated toner compositions, which comprises mixing, in the absence of a solvent, a core monomer, an initiator, pigment particles, a first shell monomer, stabilizer, and water; thereafter adding a second shell monomer, thereby enabling an interfacial polymerization reaction between the first and second shell monomers; and subsequently effecting a free radical polymerization of the core monomer.

U.S. Pat. No. 4,851,318 discloses an improved process for preparing encapsulated toner compositions which comprises mixing core monomers, an initiator, pigment particles, and oil soluble shell monomers, homogenizing the mixture into an aqueous surfactant solution to result in an oil-in-water suspension enabling an interfacial polymerization reaction between the oil soluble and the water soluble shell monomers, subsequently adding a low molecular weight polyethylene oxide surfactant protective colloid, and thereafter effecting free radical polymerization of the core monomers by heating.

Another recent application of interfacial polymerization is described in copending U.S. application Ser, No. 09/722, 334, filed Nov. 28, 2000, where rotatable gyricon spheres are encapsulated along with a dielectric fluid within a polymeric shell formed by interfacial condensation polymerization. This copending application is incorporated herein by reference in its entirety.

Methods of providing coatings to particles for forming membranes or encapsulating shells around the particles still require improvement with respect to providing an accurate and precise amount of coating to the particles. Further, it would also be desirable to develop a method not requiring immersion of the coating into an aqueous composition for polymerization as such requires recovery and washing steps to also be used.

SUMMARY OF THE INVENTION

It is therefore an object of the present invention to develop a method for dosing particulate cores with an accurate and precise amount of coating.

It is a still further object of the present invention to develop a method of coating particulate cores with a coating that eliminates the need for dispersion within an aqueous composition.

It is a still further object of the present invention to develop a simplified method of forming a shell around a particulate core via interfacial condensation polymerization.

These and other objects of the present invention are achieved herein by a method of coating a liquid or solid particulate core in which the method comprises dropping or suspending the particulate core in an atmosphere and then applying a liquid coating while the particulate core is dropped or suspended, the applying of the liquid coating comprising either (a) spraying the liquid coating onto the particulate core with an ink jet or (b) moving the particulate core through a fog of the liquid coating.

These and other objects of the invention are also achieved by a method for encapsulating a liquid or solid particulate core within a polymeric shell in which the method comprises dropping or suspending the particulate core in an atmosphere, then applying a first coating composition containing a first reactant to the particulate core while the particulate core is being dropped or suspended, the applying of the first coating composition comprising (a) spraying the first coating composition onto the particulate core with an ink jet or (b) moving the particulate core through a fog of the first coating composition, and subsequently exposing the particulate core coated with the first coating composition to a second composition containing a second reactant which reacts with the first reactant, which second composition is immiscible with the first coating composition, whereby the polymeric shell is formed by interfacial polymerization.

The invention enables the formation of membranes or polymer shells around a variety of particulate core materials, and is most suitable for coating a core surrounded by a fluid, all of which is encapsulated within a polymer skin or shell (as in encapsulated gyricon spheres), using precise amounts of coating materials, thereby reducing waste and improving efficiencies of the process.

DETAILED DESCRIPTION OF PREFERRED EMBODIMENTS

The present invention is applicable to form membranes or polymer shells around a variety of different particulate materials. The term "particulates" as used herein is intended to mean solid particles as well as liquid particles or droplets. The particulates can have most any size, but the process is most applicable to apply precise coatings to particulate cores having an average size (diameter) on the order of, for example, about 1 micron to about 1,000 microns.

Figure 1:
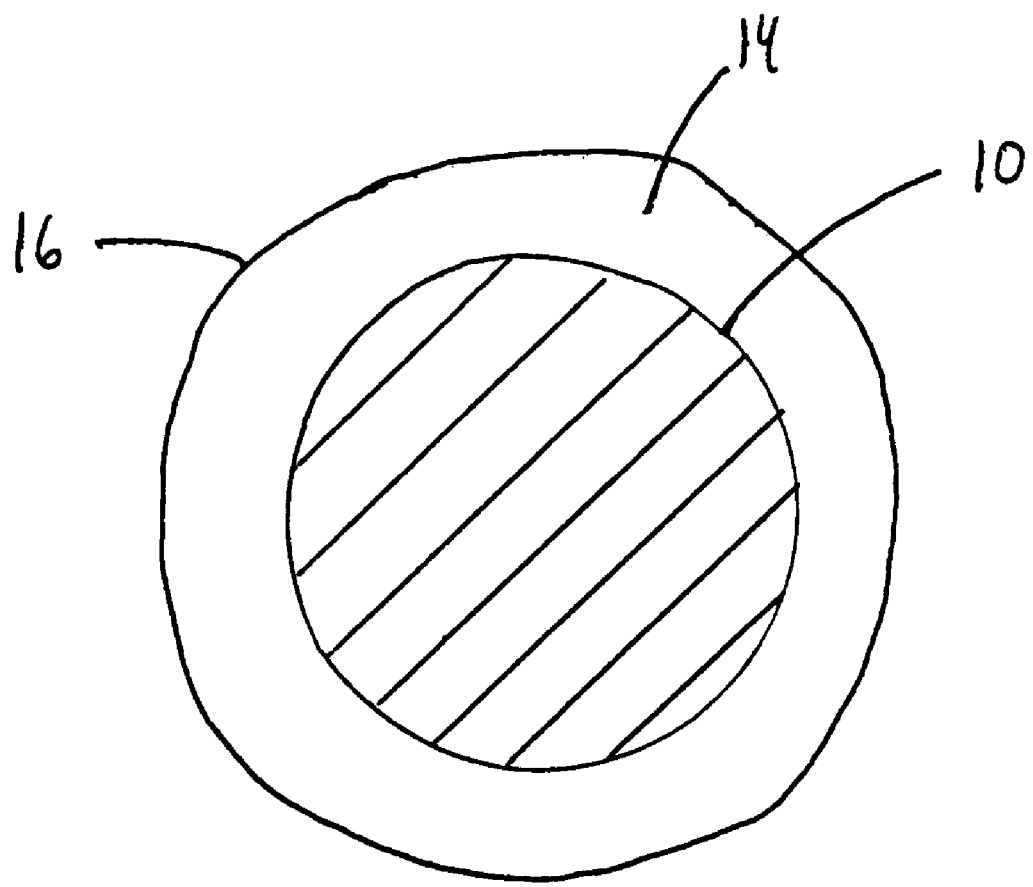
FIG. 1 shows a cross-sectional structure of an encapsulated core comprising the core, fluid surround, and polymer encapsulation.

A preferred encapsulated material of the present invention is shown in FIG. 1. Here, a solid particle core 10, for example a bichromal gyricon sphere, is suspended within a liquid 14 and all encapsulated within a polymeric shell 16. To derive this structure, as explained more filly below, the core is first coated with a liquid coating containing the suspending liquid, and then the polymeric shell is formed therearound. The first coating most preferably contains components (e.g., monomers) that are used in forming the encapsulating polymer shell.

The particulate cores of the present invention can comprise any suitable material that might be coated with a membrane and/or encapsulated within a polymer shell. Suitable core materials include, for example, colorants (pigments or dyes), for example for toners, pharmaceutical compositions, fingicides, insecticides, food products, flavors, perfumes, paints, catalysts, gyricon spheres for electric paper display elements, etc.

The coating to be applied is most preferably in liquid form. Where both the particulate core (including a solid core surrounded by a liquid) and the coating are liquid, the core and coating are most preferably respectively comprised of immiscible liquids so that these separate layers do not become indistinguishably blended. Immiscible liquids are, for example, hydrophobic liquids such as organic based liquids which are immiscible with hydrophilic liquids such as aqueous based liquids.

Thus, in this embodiment, a hydrophobic liquid core may be rendered hydrophilic, e.g., for dispersion within an aqueous based composition, by coating with a membrane of a hydrophilic coating.

Further in this embodiment, the coating applied to the particulate core can be comprised of a composition that contains one or more components which react to crosslink so as to form a polymer or which react with one or more components of the core. Thus, for example, the core may contain a monomer that reacts with water or a comonomer, and the coating may contain water or the comonomer. In this manner, precise amounts of polymeric coatings may be formed around the particulate core, and may optionally also be chemically bonded to the particulate core.

The coating is applied in precisely controlled amounts to the surface of the core in one of two ways. In a first method, the particulate core is made to drop past an ink jet apparatus that sprays (or jets) the coating composition to the surface of the particle. An example apparatus is illustrated in FIG. 2.

Figure 2:
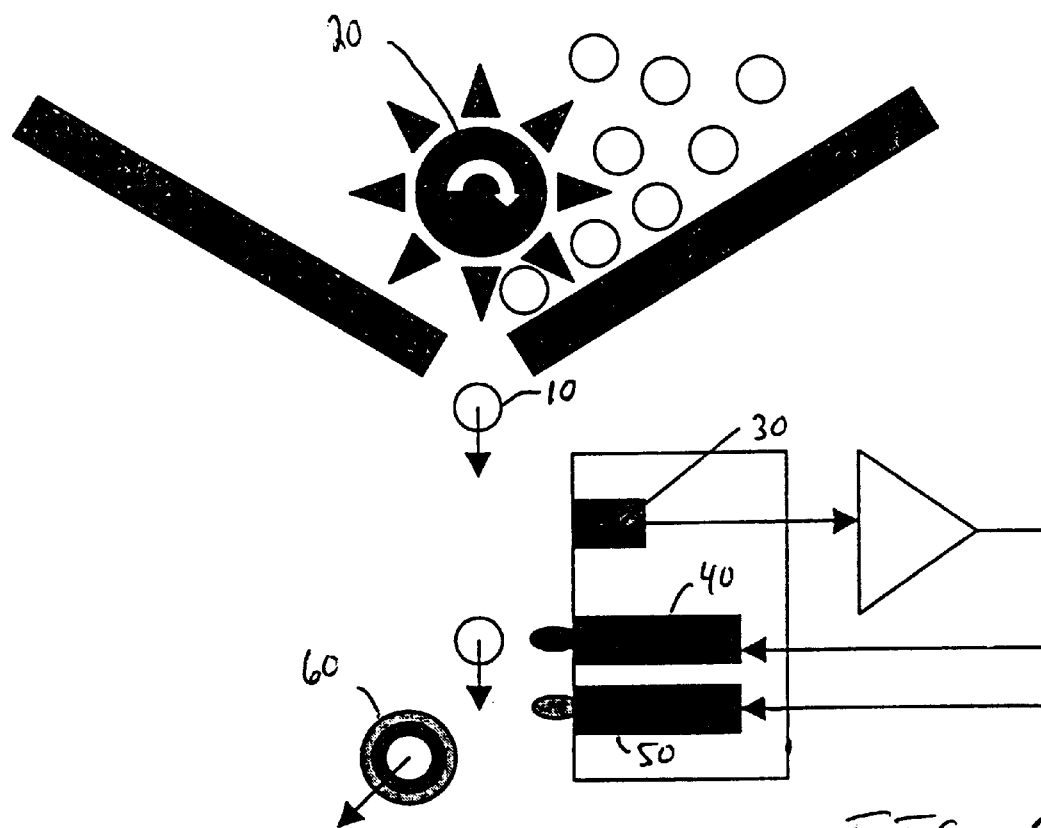
FIG. 2 is a diagram of an apparatus for applying the coating via ink jets.

In FIG. 2, the particulate cores 10, in this case solid particles, are fed to drop via a feeding mechanism 20. The ink jet apparatus includes a sensor 30 that senses each falling particle 10 as it passes by the sensor. Any suitable sensing device known to the art may be used without limitation. For example, a ball sensor comprised of a LED-photodiode pair may be used. When the sensor 30 detects the presence of a falling particle 10, a signal is sent to activate the first ink jet nozzle 40, for example a drop-on-demand ink jet, which sprays/jets a predetermined amount of the coating composition onto the particle. The timing of the spraying can be readily set by a practitioner in the art so that the spraying/jetting occurs precisely when the particle is in front of the first ink jet nozzle 40.

The coating rapidly flows around the entire surface of the core due to surface tension minimization, i.e., surface energy drives the coating to equilibrate rapidly around the entire surface of the core. To do this, the liquid must wet the core, which indicates that the liquid-core interfacial free energy must be lower than the sum of the free energies of the core and fluid.

The coated core 60 may be collected once coated. As mentioned above, the coating may be made to react with itself, i.e., crosslink, or react with the core. The reaction may be assisted by applying, e.g., heat, microwave irradiation, UV radiation, etc., if necessary, after the core is coated. This may be applied as the particle is still dropping so that the reaction is complete before the particle stops dropping.

Alternatively, the coated core may be directly dropped into another composition to which it is to be included, for example an emulsion.

Further, if desired, additional coatings may also be applied following the first coating. As shown in FIG. 2, this could be done using the same inkjet apparatus simply by including a second ink jet nozzle 50 downstream from the first ink jet nozzle 40. Application of a second coating material is desired in a preferred embodiment of the present invention in which a polymer encapsulating shell is formed around the core (comprised of the core within a surrounding or suspending liquid) by interfacial condensation polymerization, which embodiment is discussed more fully below.

A second method for applying the coating in precisely controlled amounts to the surface of the core involves the formation of a fog of the coating composition through which the particulate cores to be coated are made to move. The cores pick up the coating as fog droplets on its surface as the cores move through the fog. Here again, the coating material quickly equilibrates around the entire surface of the core due to surface tension minimization, thereby forming the desired precise coating around the core.

In this embodiment, the core can be made to move through the fog of the coating composition in any suitable manner. For example, the cores may be suspended in an atmosphere, e.g., a vacuum or air, and then be made to move through the fog at a desired rate. Such could be done, for example, by using airjets to move the suspended particles through the fog composition. In a preferred embodiment, the core particles are made to drop in an atmosphere through the fog composition also contained in the atmosphere, the dropping being effected in a manner similar to that described above with respect to the use of ink jets.

The fog of the coating composition may be created by any known method. Preferably, the fog is created by applying ultrasonic energy to a pool of the coating composition, thereby causing discrete fog droplets of the composition with drop volumes narrowly distributed to form, much the same way as a vaporizer creates water droplets. The fog may also be created simply by heating the composition to boiling and allowing the vapor to condense into droplets in a cool atmosphere.

To control the amount of fog picked up by the cores, a fog with very small drop volumes compared to the desired coating volume scale is created and the core particulates passed through the fog. A narrow distribution in the number of fog droplets picked up by the particle can be controlled by varying the fog density, interaction time, droplet size, etc. The root mean square (standard deviation of the drop volume divided by the average drop volume) variation in liquid volume divided by total volume should be about $(V_{mist\ droplet}/V_{aggregated\ volume})^{1/2}$, i.e., $1/n^{1/2}$, where n is the number of fog drops aggregated into the particle-surrounding volume.

Thus, this method can also be used to precisely control the amount of coating applied to the particulate core.

Also in this embodiment, a second coating can be applied upon the first coating, also by forming a fog of the second coating composition. The second fog may be formed beneath the first fog so that a particle core dropping through the fogs picks up, in succession, the first fog and then the second fog. Again, this is most preferably done when interfacial polymerization is to be effected between components of the two coating compositions as explained more fully below.

Most preferably, the coating is applied to the core in picoliter volumes. If the ratio r is defined as r=(thickness of fluid/radius of core), then r should fall within the range of about $10^{-2}$ to about 1. The volume ratio v of the fluid to that of the core then is $v=(1+r)^3-1$. Then v preferably falls within a range of about 2 to about 20 pL for a core of diameter 50 microns.

As the coating material, generally any coating that can be applied to a particulate core can be used. As mentioned above, the coating most preferably needs to be a liquid for coating. The coating can include, for example, monomeric materials that can be crosslinked or that can be reacted with a component of the core particulate, waxes, gels, additives such as colorants, reaction aids (e.g., crosslinking aids, catalysts, curing aids, etc.), property aids (e.g., flow control agents, etc.), prepolymer or polymer materials, etc. The compositions may include either organic (hydrophobic) or aqueous (hydrophilic) solvents.

In a preferred embodiment, the core layer and each successive coating layer are immiscible with each directly adjacent layer so as to prevent blending of the layers during the coating process.

In a most preferred embodiment of the present invention, the method of precisely applying controlled amounts of coating is used in forming a polymeric shell encapsulant material around a particulate core via interfacial condensation polymerization. Most preferred is a sphere surrounded by a thin fluid layer, surrounded in turn by a polymerized skin.

In this embodiment, the method for encapsulating a liquid or solid particulate core within a polymeric shell comprises dropping or suspending the particulate core in an atmosphere, applying a first coating composition containing a first reactant to the particulate core while the particulate core is being dropped or suspended, the applying of the first coating composition comprising (a) spraying the first coating composition onto the particulate core with an ink jet or (b) moving the particulate core through a fog of the first coating composition, and subsequently exposing the particulate core coated with the first coating composition to a second composition containing a second reactant which reacts with the first reactant, which second composition is immiscible with the first coating composition, whereby the polymeric shell is formed by interfacial polymerization.

As the shell of the encapsulated cores, a polymeric shell is most preferred. While any suitable polymer material may be used without limitation for the shell, the shell most preferably is a polymer derived from two monomers that can be dissolved, respectively, in two mutually immiscible solvents (such as, for example, organic solvents and water). This enables the polymer to be formed at the interface of the two solvents via interfacial condensation polymerization, as more fully explained below.

Shell polymers suitable for use with the present invention include those which may be formed in an interfacial condensation polymerization process. Typical shell polymers include polyureas, polyurethanes, polyesters, thermotropic liquid crystalline polyesters, polycarbonates, polyamides, polysulfones, and the like, or mixtures of these polymers such as poly(urea-urethanes), poly(ester-amides), and the like, which can be formed in a polycondensation reaction of suitably terminated prepolymers or macromers with different condensation monomers. For example, a preformed alcohol terminated urethane prepolymer can be copolymerized with a diacyl halide to form a poly(ester-urethane) in an interfacial reaction, or an amine terminated amide prepolymer can be copolymerized with a diisocyanate to produce a poly(urea-amide) copolymer. Epoxy monomers or oligomers such as Epikote 819 can also be added in amounts of from about 0.01 percent to about 30 percent to copolymerize into the shell as strengthening agents. Various polyfunctional shell monomers, such as triamines, triisocyanates, and triols can be employed in small quantities of from about 0.01percent to about 30 percent as crosslinking agents to introduce rigidity and strength into the shells. Shell polymers can also be formed by the reaction of aliphatic diisocyanates, such as meta-tetramethylene diisocyanate and a polyamine, reference for example the U.S. Pat. No. 5,037,716, incorporated herein by reference in its entirety.

Further, in an alternative embodiment, the shell may be prepared from a material that reacts with water such as, for example, a cyanoacrylate material. In this embodiment, the core is first coated with a composition containing the material that reacts with water, and thereafter exposed to a second composition containing water, thereby causing reaction and formation of the polymeric shell.

Most preferably, the polymer shell material is comprised of a polyamide (from, e.g., diacid chloride and diamine monomers), a polyester (from, e.g., diacid chloride and diol monomers), a polyurea (from, e.g., diisocyanate and diamine monomers), a polyurethane (from, e.g., diisocyanate and diol monomers) or mixtures thereof. The diacid chloride monomers and diisocyanate monomers may be dissolved in an organic phase, while the diamine and diol monomers may be dissolved in an aqueous phase.

Suitable shell monomers are usually selected from monomers wherein the number of chemical reacting groups per molecule is two or more. The number of reacting groups per molecule is referred to as the chemical functionality.

An organic soluble shell monomer, which has a functionality of 2 or more, reacts with an aqueous soluble shell monomer, which has a functionality of 2 or more, via interfacial condensation polymerization to generate the shell polymer in an embodiment of the present invention.

The organic soluble shell monomer can include (1) diisocyanates such as, for example, toluene diisocyanate, hexamethylene diisocyanate, trans-1,4-cyclohexane diisocyanate, meta-tetramethylxylene diisocyanate (m-TMXDI), trimethylhexamethylene diisocyanate (TMDI), hexane diisocyanate (HDI), 4,4'-dicyclohexylmethane diisocyanate (Desmodur W), 4,4'-methyldiphenyl diisocyanate and even diisocyanate prepolymers such as polyether based liquid urethane prepolymer such as the Adiprene series available from DuPont; XPS and XPH series which are toluene diisocyanate terminated polyethylene oxide prepolymers available from Air Product, or (2) diacid chlorides (or, more generally, diacid halides), such as, for example, sebacoyl chloride, terephthaloyl chloride, phthaloyl chloride, isophthaloyl chloride, azeloyl chloride, glutaryl chloride and/or adipoly chloride. Examples of organic soluble shell monomers which have a functionality greater than 2 include 1,3,5-benzenetricarboxylic acid chloride; Isonate 143L (liquid MDI based on 4,4'-methyldiphenyl diisocyanate) purchased from The Upjohn Company; and tris(isocyanatophenyl) thiophosphate (Desmodur RF) purchased from Mobay Chemical Corporation.

Examples of monomers soluble in aqueous media and with a functionality of 2 include (1) diamines such as, for example, 1,6-hexanediamine, hexamethylenediamine, 1,4-bis(3-aminopropyl)piperazine, 2-methylpiperazine, m-xylene-α,α'-diamine, 3,3'-diamino-N-methyldipropylamine, 1,3-cyclohexanebis(methylamine), 1,4-diaminocyclohexane, 2-methylpentamethylene diamine, 2-methylpentanediamine (Dytek A) purchased from DuPont, 1,2-diaminocyclohexane, 1,3-diaminopropane, 1,4-diaminobutane, 2,5-dimethylpiperazine, piperazine, fluorine-containing 1,2-diaminobenzenes purchased from PCR Incorporated, and N,N'-dimethylethylenediamine; (2) diols such as bisphenol A or any other water soluble copolycondensation coreactant monomers/prepolymers. Other aqueous soluble shell monomers having a functionality greater than 2 include diethylene triamine, bis(3-aminopropyl)amine, tris(2-aminoethyl)amine (TREN-HP) purchased from W. R. Grace Company, and the like.

More than one organic phase monomer can be used to react with more than one aqueous phase monomer. Although formation of the shell entails reaction in an embodiment between at least two shell monomers, one soluble in organic phase and one soluble in aqueous phase, as many as 5 or more monomers soluble in the organic phase and as many as 5 monomers soluble in aqueous phase can be reacted to form the shell. In some preferred instances, 2 monomers soluble in the organic phase and 2 monomers soluble in aqueous phase can be reacted to form the shell.

In a most preferred embodiment, the organic phase material also includes an additional liquid material that does not participate in formation of the shell. This liquid may be, for example, a dielectric liquid such as, for example, an oil (e.g., silicone oil or vegetable oil) or any plasticizer (e.g., a fluorinated liquid). As this liquid does not form part of the shell, it remains surrounding the core particle (preferably a solid core such as a gyricon sphere) so that the structure comprises a solid core surrounded by a suspending liquid, in turn all encapsulated within the polymeric shell (for example as illustrated in FIG. 1).

Further, optional reaction aids such as catalysts or curing agents, may be added to either of the solutions, if desired.

For example, a shell crosslinking agent such as Desmodur RF (Bayer) may be added to the organic phase, if desired, in effective amounts of, for example, from about 0 to about 3 percent by weight of the monomers.

The organic composition is made by, for example, mixing the components and/or otherwise dissolving the components in the hydrophobic solvent.

Interfacial condensation polymerization occurs at the interface between the two mutually immiscible solvents, usually a hydrophobic organic based solvent and a hydrophilic aqueous solvent (i.e., a water-based solution).

The coating of the core particulates can be done by either the ink jet method or the fog method discussed above. In a preferred embodiment, the hydrophobic (organic phase) coating is applied as the first coating.

The coated particle is next exposed to the second coating material, which is preferably an aqueous phase solution containing at least one monomer that coreacts with the monomer(s) dissolved in the organic phase. The aqueous solution may be made by, for example, dissolving the monomer in water, preferably deionized water. While surfactants may be used if required, it is desirable to avoid the use of surfactants in order to avoid the need to wash the encapsulated particles following collection.

Within the polymeric shell, the molar ratio of the organic soluble monomer to the aqueous soluble monomer is from about 1:1 to about 1:4, and preferably from about 1:1 to about 1:1.5.

In general, the interfacial condensation polymerization is conducted by first coating the core particulate with a first organic phase composition containing a first monomer dissolved in the organic solvent, and optionally a dielectric liquid (for example where the core is a gyricon sphere as in a preferred embodiment of the present invention), and subsequently exposing the coated core to a second aqueous phase composition containing a second monomer dissolved in the aqueous solvent, whereby the first monomer and the second monomer are made to react to form the encapsulating shell.

The exposing of the coated cores to the second composition may be done in any number of ways. For example, the exposing may be done by (a) spraying the second composition onto the particulate core coated with the first coating composition with an ink jet, (b) moving the particulate core coated with the first coating composition through a fog of the second composition or (c) adding the particulate core coated with the first coating composition into the second composition. The ink jet and fog embodiments for this step are the same as discussed above. In (c), the organic phase is brought into contact with the aqueous phase, for example by dropwise addition of the coated core into a stirred aqueous phase solution. Upon contact, the monomers react (via a condensation reaction), forming a polymer skin around the droplets. As a result, the polymer shell is formed around the core.

The polymeric shell typically forms very quickly upon contact of the two phases. Preferably, the condensation reaction is conducted at room temperature for ecomomies. However, elevated temperatures may be used, if desired, to aid in the reaction. Following the encapsulation, the encapsulated cores are collected by any suitable method known in the art. Following collection, the encapsulated cores may be washed, if desired or needed.

By this method, it is possible to obtain various encapsulated materials. For example, a liquid core may be encapsulated within a solid polymer shell, which shell may be dissolved or burst to later release the core liquid when desired. A solid core may be present along with liquid in the core, for example as with a gyricon element suspended in a dielectric fluid such as an oil or a plasticizer. A solid core may be encapsulated within a polymeric shell, for example to create a toner composition.

By using ink jets or fogs, the method of the present invention enables the amount of coating to be precisely controlled, thereby eliminating waste in the application process. Also, the process enables control of the optical fill factor for gyricon inks. Further, by coating in this manner, the need to immerse the core particulates in the composition can be eliminated, thereby greatly simplifying collection of the coated cores.

Although the invention has been described with reference to specific preferred embodiments, it is not intended to be limited thereto. Rather, those having ordinary skill in the art will recognize that variations and modifications may be made therein which are within the spirit of the invention and within the scope of the claims.

What is claimed is:

1. A method of coating a liquid or solid particulate core, the method comprising dropping or suspending the particulate core in an atmosphere and then applying a liquid coating while the particulate core is being dropped or suspended, the applying of the liquid coating comprising (a) spraying the liquid coating onto the particulate core with an ink jet or (b) moving the particulate core through a fog of the liquid coating.

2. The method according to claim 1, wherein the liquid coating is made solid after application by reaction or drying.

3. The method according to claim 1, wherein the particulate core is solid.

4. The method according to claim 1, wherein the particulate core is selected from the group consisting of a gyricon sphere, a pharmaceutical composition and a colorant.

5. The method according to claim 1, wherein the particulate core is liquid and wherein the liquid coating is comprised of a liquid immiscible with the particulate core.

6. The method according to claim 1, wherein the applying of the liquid coating comprises spraying the liquid coating onto the particulate core with an ink jet.

7. The method according to claim 6, wherein the particulate core is dropped past the ink jet, and wherein the ink jet includes a sensor to detect the particulate core, which sensor activates the spraying of the liquid coating onto the particulate core.

8. The method according to claim 1, wherein the applying of the liquid coating comprises moving the particulate core through a fog of the liquid coating.

9. The method according to claim 8, wherein the fog of the liquid coating is produced by ultrasonic energy or by boiling.

10. The method according to claim 1, wherein the method further comprises applying an additional liquid coating to the coated particulate core.

11. The method according to claim 10, wherein the additional liquid coating contains a component that reacts with a component of the liquid coating to yield a polymeric shell.

12. The method according to claim 11, wherein the particulate core is a solid core and wherein the first coating composition further comprises a liquid in which the solid core is suspended within the polymeric shell.

13. A method for encapsulating a liquid or solid particulate core within a polymeric shell, the method comprising:
dropping or suspending the particulate core in an atmosphere,
applying a first coating composition containing a first reactant to the particulate core while the particulate core is being dropped or suspended, the applying of the first coating composition comprising (a) spraying the first coating composition onto the particulate core with an ink jet or (b) moving the particulate core through a fog of the first coating composition, and
subsequently exposing the particulate core coated with the first coating composition to a second composition containing a second reactant which reacts with the first reactant, which second composition is immiscible with the first coating composition, whereby the polymeric shell is formed by interfacial polymerization.

14. The method according to claim 13, wherein the first coating composition is hydrophobic and the second composition is hydrophilic.

15. The method according to claim 13, wherein the particulate core is a solid core and wherein the first coating composition further comprises a liquid in which the solid core is suspended within the polymeric shell.

16. The method according to claim 13, wherein the exposing of the particulate core coated with the first coating composition to the second composition comprises (a) spraying the second composition onto the particulate core coated with the first coating composition with an ink jet, (b) moving the particulate core coated with the first coating composition through a fog of the second composition or (c) adding the particulate core coated with the first coating composition into the second composition.

17. The method according to claim 13, wherein the first reactant is a diacid chloride monomer and the second reactant is a diamine or a diol monomer.

18. The method according to claim 13, wherein the first reactant is a diisocyanate monomer and the second reactant is a diamine or a diol monomer.

19. The method according to claim 13, wherein the applying of the first coating composition comprises spraying the first coating composition onto the particulate core with an ink jet.

20. The method according to claim 19, wherein the particulate core is dropped past the ink jet, and wherein the ink jet includes a sensor to detect the particulate core, which sensor activates the spraying of the first coating composition onto the particulate core.

21. The method according to claim 12, wherein the applying of the first coating composition comprises moving the particulate core through a fog of the first coating composition.

22. The method according to claim 21, wherein the fog of the first coating composition is produced by ultrasonic energy or by boiling.

23. The method according to claim 21, wherein the exposing to the second coating composition comprises moving the particulate core coated with the first composition through a fog of the second coating composition.

24. The method according to claim 13, wherein the particulate core is a gyricon sphere.

* * * * *